US008793632B2

(12) United States Patent
Demircan et al.

(10) Patent No.: US 8,793,632 B2
(45) Date of Patent: Jul. 29, 2014

(54) TECHNIQUES FOR ELECTROMIGRATION STRESS DETERMINATION IN INTERCONNECTS OF AN INTEGRATED CIRCUIT

(71) Applicant: Freescale Semiconductor, Inc., Austin, TX (US)

(72) Inventors: Ertugrul Demircan, Austin, TX (US); Mehul D. Shroff, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/964,344

(22) Filed: Aug. 12, 2013

(65) Prior Publication Data
US 2013/0326448 A1    Dec. 5, 2013

Related U.S. Application Data

(63) Continuation-in-part of application No. 13/484,328, filed on May 31, 2012, now Pat. No. 8,510,695.

(51) Int. Cl.
*G06F 17/50* (2006.01)

(52) U.S. Cl.
USPC ........... 716/112; 716/110; 716/111; 716/115; 716/126; 716/132; 716/136

(58) Field of Classification Search
CPC ............ G06F 17/5068; G06F 17/5045; G06F 17/5077; G06F 17/505; G06F 17/5056; G06F 17/50
USPC .................. 716/110–112, 126, 132, 136, 115
See application file for complete search history.

(56) References Cited

U.S. PATENT DOCUMENTS

| | | | |
|---|---|---|---|
| 5,379,231 A * | 1/1995 | Pillage et al. | 703/14 |
| 6,789,237 B1 * | 9/2004 | Ismail | 716/113 |
| 6,802,049 B2 * | 10/2004 | Teig et al. | 716/124 |
| 6,825,671 B1 * | 11/2004 | Zhang | 324/525 |
| 7,318,207 B2 * | 1/2008 | Takabe | 716/115 |
| 7,451,411 B2 * | 11/2008 | Hau-Riege et al. | 716/119 |
| 8,510,695 B1 * | 8/2013 | Demircan et al. | 716/112 |
| 8,656,325 B2 * | 2/2014 | Barwin et al. | 716/100 |

(Continued)

OTHER PUBLICATIONS

Lienig, J., et al., "Current driven wire planning for electromigration avoidance in analog circuits", 2003, ACM, Proceedings of the 2003 Asia and South Pacific Design Automation Conference, pp. 783-788.*

(Continued)

*Primary Examiner* — Stacy Whitmore
(74) *Attorney, Agent, or Firm* — Yudell Isidore Ng Russell PLLC

(57) ABSTRACT

In one or more embodiments, one or more methods, processes, and/or systems described can determine stress failures in interconnect segments of integrated circuit designs and correct those failure via modifying the interconnect segments of the integrated circuit designs with one or more additions to the interconnect segments of the integrated circuit designs. Potentials can be received from a simulation, and one or more failures of an interconnect segment can be determined via the potentials from the simulation. For example, a failure can be determined via a comparison with a potential from the simulation and a critical potential. An interconnect segment can be modified with a stub such that a comparison with a potential from the simulation and a critical potential to provide a non-failing, modified interconnect segment.

20 Claims, 8 Drawing Sheets

(56) References Cited

U.S. PATENT DOCUMENTS

| | | | |
|---|---|---|---|
| 8,694,950 B2* | 4/2014 | McSherry et al. | 716/136 |
| 2003/0016025 A1* | 1/2003 | Martter et al. | 324/537 |
| 2007/0300200 A1* | 12/2007 | Hau-Riege et al. | 716/13 |
| 2008/0109106 A1* | 5/2008 | Berger et al. | 700/182 |
| 2009/0031264 A1* | 1/2009 | Rittman et al. | 716/5 |
| 2009/0288059 A1* | 11/2009 | Dimou et al. | 716/18 |
| 2010/0301487 A1* | 12/2010 | Kawasaki et al. | 257/773 |
| 2013/0154128 A1* | 6/2013 | Wang et al. | 257/786 |
| 2013/0185684 A1* | 7/2013 | Barwin et al. | 716/104 |

OTHER PUBLICATIONS

Riege, S. P., et al., "A hierarchical reliability analysis ofr circuit design evaluation", 1998, IEEE, IEEE Transactions on Electron Devices, vol. 45, No. 10, pp. 2254-2257.*

* cited by examiner

TECHNIQUES FOR ELECTROMIGRATION STRESS DETERMINATION IN INTERCONNECTS OF AN INTEGRATED CIRCUIT

This application is a continuation-in part-of and claims priority to "TECHNIQUES FOR ELECTROMIGRATION STRESS DETERMINATION IN INTERCONNECTS OF AN INTEGRATED CIRCUIT", U.S. patent application Ser. No. 13/484,328, filed May 31, 2012 which is incorporated by reference as though fully set forth herein.

BACKGROUND

1. Field

This disclosure relates generally to integrated circuits and, more specifically, techniques for electromigration stress determination in interconnects of an integrated circuit.

2. Related Art

Electromigration refers to a process of diffusion of metal atoms due to mechanical stress created via electrical current flowing through one or more interconnects. This results in formations of voids and hillocks at low potential nodes and high potential nodes, respectively, and can lead to resistance increases and circuit failures. In general, electromigration should be considered in applications where relatively high direct current densities are expected, such as in microelectronics and related structures. As structure sizes in integrated circuits (ICs) decrease, the practical significance of electromigration increases. Electromigration first became of practical interest when the first ICs became commercially available. Electromigration research in the integrated circuit (IC) field began at a time when metal interconnects in ICs were about ten micrometers (microns) wide. Currently, IC interconnects are hundreds to tens of nanometers in width. Electromigration decreases the reliability of ICs (e.g. chips) and can cause the eventual loss of connections or failure of a circuit.

Although electromigration damage ultimately results in failure of an affected IC, initial symptoms may include intermittent glitches that are challenging to diagnose. As some interconnects fail before other interconnects, a circuit may exhibit random errors that are indistinguishable from other failure mechanisms. In a laboratory setting, electromigration failure may be viewed with an electron microscope, as interconnect erosion leaves visual markers on metal layers of an IC. With increasing IC miniaturization the probability of IC failure due to electromigration increases, as both power density and current density increase as IC size decreases. In advanced semiconductor manufacturing processes, copper has replaced aluminum as the interconnect material of choice, as copper is intrinsically less susceptible to electromigration. In modern consumer electronic devices, ICs rarely fail due to electromigration effects, because proper semiconductor design practices incorporate the effects of electromigration into the IC layouts. That is, nearly all IC design houses use electronic design automation (EDA) tools to detect and correct electromigration problems at the transistor layout-level.

In general, the "Blech length" has been used to denote a length limit for an interconnect below which electromigration will not occur at a current density. That is, any interconnect whose length is below the "Blech length" will not typically fail due to electromigration at lower current densities, but may fail at higher current densities. In general, an interconnect whose length is below the "Blech length" experiences a mechanical stress build-up that causes a reverse migration process that reduces or even compensates for material flow.

BRIEF DESCRIPTION OF THE DRAWINGS

Embodiments are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
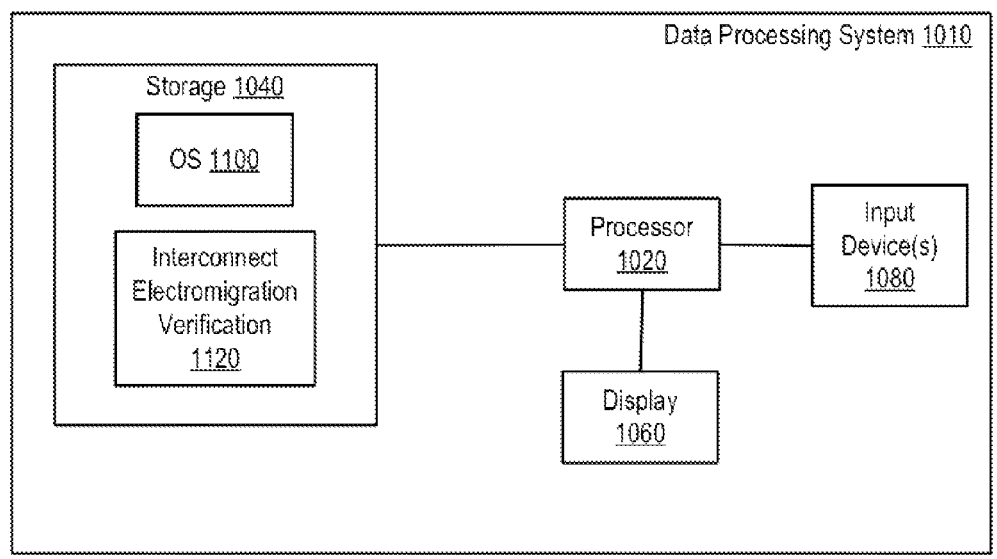
FIG. 1 provides an exemplary diagram of a relevant portion of an exemplary data processing system that performs electromigration stress determination for interconnects of an integrated circuit design, according to one or more embodiments.

In the following detailed description of embodiments this disclosure, specific exemplary embodiments that may be practiced are described in sufficient detail to enable those skilled in the art to practice the described embodiments, and it is to be understood that other embodiments may be utilized and that logical, architectural, programmatic, mechanical, electrical and other changes may be made without departing from the spirit or scope of the described embodiments. The following detailed description is, therefore, not to be taken in a limiting sense, and the scope of the described embodiments can be defined by appended claims and their equivalents.

In one or more embodiments, the term "coupled" can include a connection between one or more elements and components, among others. In one example, a connection can include a direct electrical connection between one or more elements and components, among others. In another example, a connection can include an indirect electrical connection between one or more elements and components, among others, achieved utilizing one or more intervening elements and/or components.

Using a "Blech length" to determine a length limit for an interconnect of an integrated circuit (IC) may result in overdesign of IC interconnects. In one or more embodiments, an interconnect can couple two or more semiconductor devices, of an IC, together. In general, a Blech length for an interconnect can be determined using ideal, straight-line, uniform width test structures. However, interconnect shapes typically found in ICs include bends, turns, forks, and varying width, thus introducing substantial deviations from the ideal case. According to the present disclosure, techniques are disclosed that solve for potentials in IC interconnects that arise as a result of current flowing through one or more interconnects. The potentials can then compared to electromigration design rules to check for electromigration risk.

In one or more embodiments, one or more maximum interconnect stresses can be evaluated via an interconnect directed graph. For example, an interconnect directed graph can be constructed following identification of current direction in all interconnect segments of a net. For example, potentials (e.g., voltages) can be retrieved from a SPICE (Simulation Program with Integrated Circuit Emphasis) simulation file.

In one or more embodiments, calculated stresses can be compared to electromigration design rules to check for electromigration risk. For example, the techniques account for potential to calculate maximum stress in interconnect segments for electromigration checks. For instance, maximum interconnect stress can be evaluated via evaluation of an interconnect directed graph. In one or more embodiments, an interconnect directed graph can be constructed following identification of current direction in all interconnect segments of a net. For example, current direction may be retrieved from a SPICE simulation file.

In one or more embodiments, disclosed techniques can be primarily targeted at verification and can provide a solution to determine a critical stress that can determine a critical length needed for applying the Blech effect, which is applicable to interconnect widths less than a certain width, e.g., about three microns (i.e., micrometers). For example, the disclosed techniques can provide a solution of determining a maximum stress of an arbitrary interconnect, which generally leads to a more accurate determination of electromigration risk and, in turn, higher quality products.

In one or more embodiments, the Blech effect allows shorter interconnects to carry larger currents than longer interconnects. For example, in a metal 1 (M1) layer for a 55 nanometer design, current densities based on length 'L' may be as follows: an interconnect with 'L' less than or equal to 5 microns can carry 4 mA current density; an interconnect with 'L' greater than 5 microns and less than 20 microns can carry 20/L mA current density; and an interconnect with 'L' greater than or equal to 20 microns can carry 1 mA current density. In order to calculate current limits, 'L' must first be calculated. For example, conventional length calculation in CAD (computer aided design) tools is pessimistic and can result in larger designs and IC quality issues. Conventionally, an accurate determination of current limits has required solving the full equations for stress/strain relation, mass conservation, and stress source from electron current. In general, solving the full equations is complex and time-consuming and, as such, the Blech length has traditionally been defined to be the maximum spanning length of all interconnect branches in a net. Thus, the Blech length is a conservative approximation for determining current limits of each interconnect segment.

In one or more embodiments, one or more failures of an interconnect can be determined via one or more evaluations of nodes of an interconnect. In one example, a node of an interconnect can include a portion of the interconnect where current changes direction. In another example, a node of an interconnect can include a portion of the interconnect where current changes density. In one or more embodiments, one or more evaluations of nodes of an interconnect can include comparing a value, based on a potential (e.g., a voltage) of a node, with a critical potential. For example, the value can include a difference of a distributed potential and a potential of a node.

In one or more embodiments, one or more failures of an interconnect can be corrected via one or more additions and/or modifications to and/or of the interconnect. For example, an interconnect can be modified via an addition of a stub to reduce a potential to a value below a critical potential. For instance, each of the one or more failures of an interconnect can be corrected via addition of respective one or more stubs.

Turning now to FIG. 1, an exemplary data processing system is illustrated that is configured to execute various electronic design automation (EDA) software, according to one or more embodiments. As illustrated, a data processing system 1010 can include a processor 1020 (which may include one or more processor cores for executing program code) coupled to one or more of a storage 1040, a display 1060, and one or more input devices 1080, among others. In one or more embodiments, storage 1040 can include one or more storage devices. In one example, storage 1040 can include one or more non-transitory tangible computer readable storage devices. Storage 1040 can include, in another example, an application appropriate amount of volatile memory (e.g., dynamic random access memory (DRAM)), non-volatile memory (e.g., flash, read-only memory (ROM), or static RAM), and/or non-volatile mass storage devices, such as magnetic, solid state, and/or optical disk drives. As is shown, data storage subsystem 1040 can include an operating system (OS) 1100, as well as one or more application programs, such as an interconnect electromigration verification software 1120.

In one or more embodiments, interconnect electromigration verification software 1120 can include instructions, executable by processor 1020, that are in accordance with one or more methods, processes, and/or flowcharts described herein. In one or more embodiments, a data processing system configured to process and/or transform data in accordance with at least a portion of one or more of methods, processes and/or flowcharts described herein can be, include, and/or form one or more means for performing one or more functions in accordance with at least a portion of one or more of methods, processes and/or flowcharts described herein.

Display 1060 can be or include one or more of, for example, a cathode ray tube (CRT) and a liquid crystal display (LCD) monitor, among others. Input device(s) 1080 can include one or more of, for example, a mouse, a keyboard, haptic devices, and a touch screen, among others. In one or more embodiments, a data processing system and/or a computer system can be broadly defined as a device that includes a processor that executes instructions from storage. For example, data processing system 1010 can include various forms, such as one or more of a workstation, a laptop computer system, a notebook computer system, and a desktop computer system, among others.

Figure 2:
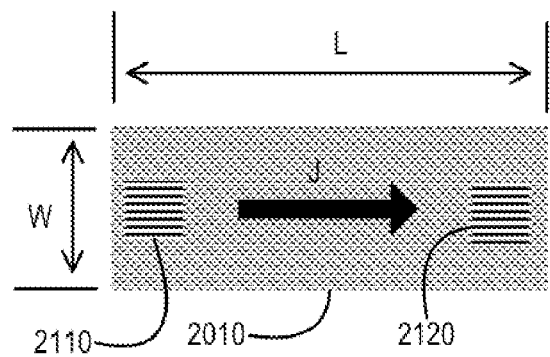
FIG. 2 illustrates a first exemplary interconnect, according to one or more embodiments.

Turning now to FIG. 2, a first exemplary interconnect is illustrated, according to one or more embodiments. As illustrated, an interconnect 2010 can include nodes 2110 and 2120. In one or more embodiments, one or more nodes of an interconnect can include one or more vias. For example, one or more of nodes 2110 and 2120 can include respective one or more vias. As shown, interconnect 2010 can be associated with a length 'L' and a width 'W'. As shown, a current density 'J' (as illustrated via an arrow) can be associated with a direction from node 2110 to node 2120.

In one or more embodiments, equations for stress caused by electron current density J, stress-strain relation, and mass conservation at each node 'i' of an interconnect can be utilized to determine interconnect stress. For example, stress can be confined to a given metal layer due to metal barriers. In one or more embodiments, stress caused by electron current density 'J' may be represented by $$\frac{\partial \sigma}{\partial x} = cj,$$

where "j" is current density and $$c = \frac{Z^* e \rho}{\Omega},$$

where 'Z*' is an effective electron density, 'e' is an electron charge, 'ρ' is a resistivity, and "Ω" is an effective atomic volume. In one or more embodiments, a displacement (stress-strain relation) can be calculated via $$\frac{\partial u}{\partial x} = \frac{1}{M}\sigma,$$

where 'M' is Young's modulus, 'u' is the strain, and σ is a maximum potential of a node. In one or more embodiments, a mass conservation at a node 'i' can be calculated via $$\sum_{s \in \{j\}} u_{iks} w_s,$$

where $u_{ik}$ is a displacement at a kth node on a segment 's' and $w_s$ is a width of interconnect segment 's'. For example, the mass conservation at the node 'i' can include an amount of material mass that is flowing inward and/or outward with respect to the node 'i'.

In one example, a stress at node 2110 can be calculated via $$\sigma_{node2110} = -\frac{c}{2} \cdot J \cdot L = -\frac{c}{2}\frac{v \cdot a}{a},$$

where a=W·L and v=J·L. In another example, a stress at node 2120 can be calculated via $$\sigma_{node2120} = +\frac{c}{2} \cdot J \cdot L = +\frac{c}{2}\frac{v \cdot a}{a}.$$

In one or more embodiments, if a stress is greater than a critical strength of an interconnect, then the interconnect fails. In one example, if $\sigma_{node2110} > \sigma_C$, where $\sigma_C$ is the critical strength of interconnect 2010, then interconnect 2010 fails. In another example, if $\sigma_{node2120} > \sigma_C$, where $\sigma_C$ is the critical strength of interconnect 2010, then interconnect 2010 fails.

Figure 3:
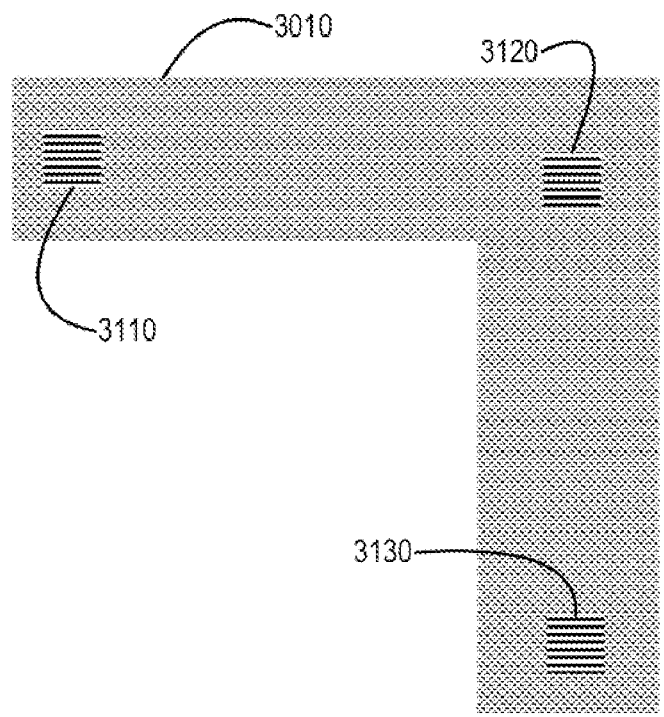
FIG. 3 illustrates a second exemplary interconnect, according to one or more embodiments.

Turning now to FIG. 3, a second exemplary interconnect is illustrated, according to one or more embodiments. As illustrated, an interconnect segment 3010 can include nodes 3110-3130. In one or more embodiments, a node can be or include a place or an area where current changes direction in an interconnect. For example, current can change direction at, around, and/or proximate to node 3120. For instance, current can flow from node 3110 to node 3130, and the current can change directions (e.g., taking a path other than a straight line) via a ninety degree turn of interconnect 3010.

In one or more embodiments, a branch can be or include a portion of an interconnect that is between two nodes. In one example, a first branch of interconnect 3010 can be or include a portion of interconnect 3010 between nodes 3110 and 3120. In another example, a second branch of interconnect 3010 can be or include a portion of interconnect 3010 between nodes 3120 and 3130.

Figure 4:
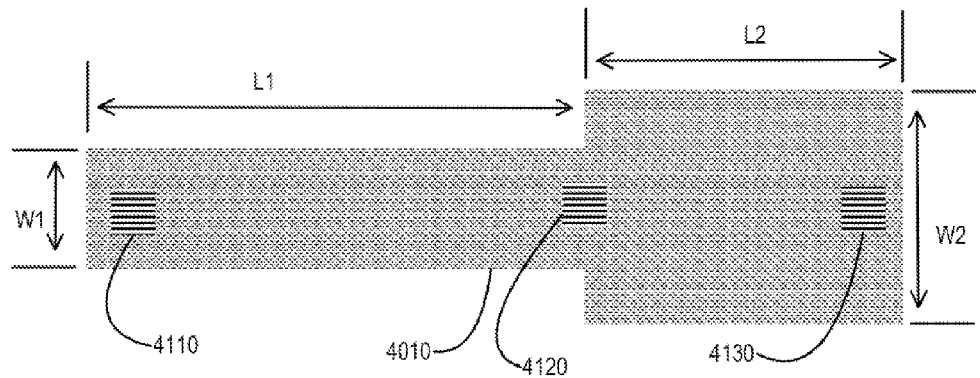
FIG. 4 illustrates a third exemplary interconnect, according to one or more embodiments.

Turning now to FIG. 4, a third exemplary interconnect is illustrated, according to one more embodiments. As illustrated, an interconnect 4010 can include nodes 4110-4130. In one or more embodiments, a node can be or include a place or an area where current density changes in an interconnect. For example, current density can change at, around, and/or proximate to node 4120. For instance, within interconnect 4010 a first current density can occur within an area of a length 'L1' by a width 'W1', and a second current density can occur within an area of a length 'L2' by a width 'W2'.

In one example, a first branch of interconnect 4010 can be or include a portion of interconnect 4010 between nodes 4110 and 4120. In another example, a second branch of interconnect 4010 can be or include a portion of interconnect 4010 between nodes 4120 and 4130.

Figure 5:
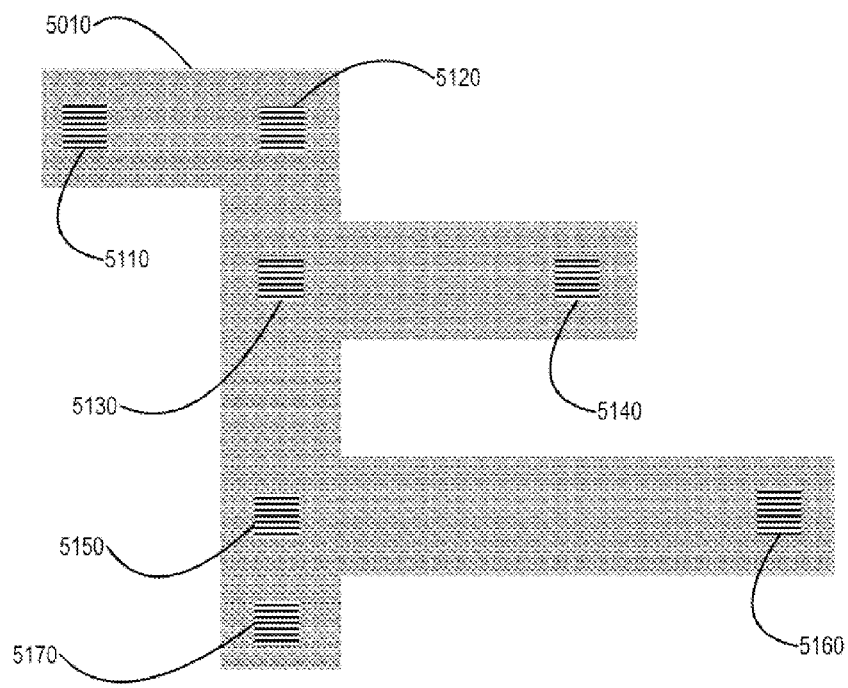
FIG. 5 illustrates a fourth exemplary interconnect, according to one or more embodiments.

Turning now to FIG. 5, a fourth exemplary interconnect is illustrated, according to one or more embodiments. As illustrated, an interconnect 5010 can include nodes 5110-5170. For example, current can change directions at one or more of nodes 5120, 5130, and 5150.

Figure 6:
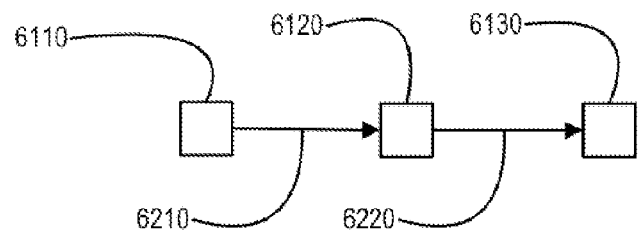
FIG. 6 provides a first exemplary directed graph that can represent an interconnect, according to one or more embodiments.

Turning now to FIG. 6, a first exemplary directed graph that can represent an interconnect is illustrated, according to one or more embodiments. In one or more embodiments, vertices of a directed graph can represent nodes of an interconnect. For example, vertices 6110-6130 of the first exemplary directed graph can represent nodes of an interconnect. In one or more embodiments, vertices of a graph can be referred to as nodes of the directed graph. For example, vertices 6110-6130 of the first exemplary directed graph can be referred to as nodes 6110-6130 of the first exemplary directed graph which can represent nodes of an interconnect.

In one or more embodiments, edges of a directed graph can represent current flow of an interconnect. For example, edges 6210 and 6220 of the first exemplary directed graph can represent current flow of an interconnect. In one instance, current can flow from a first node, of the interconnect, represented via vertex 6110 to a second node, of the interconnect, represented via vertex 6120. In another instance, current can flow from the second node, of the interconnect, represented via vertex 6120 to a third node, of the interconnect, represented via vertex 6130.

In one or more embodiments, edges of a directed graph can represent branches of an interconnect. For example, edges 6210 and 6220 of the first exemplary directed graph can represent branches of an interconnect.

Figure 7:
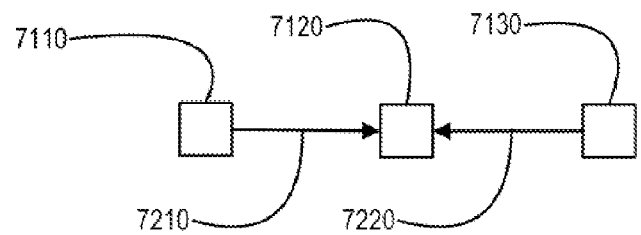
FIG. 7 provides a second exemplary directed graph that can represent an interconnect, according to one or more embodiments.

Turning now to FIG. 7, a second exemplary directed graph that can represent an interconnect is illustrated, according to one or more embodiments. As illustrated, the second exemplary directed graph can include vertices 7110-7130. For example, vertices 7110-7130 can represent nodes of an interconnect. As shown, the second exemplary directed graph can include edges 7210 and 7220.

For example, edges 7210 and 7220 can represent current flow of an interconnect. In one instance, current can flow from a first node, of the interconnect, represented via vertex 7110 to a second node, of the interconnect, represented via vertex 7120. In another instance, current can flow from a third node, of the interconnect, represented via vertex 7130 to the second node, of the interconnect, represented via vertex 7120.

Figure 8:
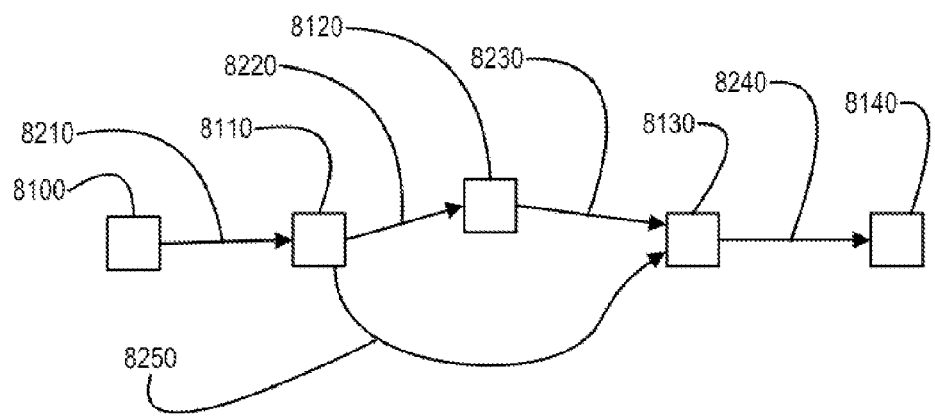
FIG. 8 provides a third exemplary directed graph that can represent an interconnect, according to one or more embodiments.

Turning now to FIG. 8, a third exemplary directed graph that can represent an interconnect is illustrated, according to one or more embodiments. As illustrated, the third exemplary directed graph can include vertices 8100-8140. For example, vertices 8100-8140 can represent nodes of an interconnect. As shown, the third exemplary directed graph can include edges 8210-8250. In one instance, current can flow from a first node, of the interconnect, represented via vertex 8100 to a second node, of the interconnect, represented via vertex 8110. In a second instance, current can flow from the second node, of the interconnect, represented via vertex 8110, to a third node of the interconnect, represented via vertex 8120. In a third instance, current can flow from the third node, of the interconnect, represented via vertex 8120 to a fourth node, of the interconnect, represented via vertex 8130. In a fourth instance, current can flow from the fourth node of the interconnect, represented via vertex 8130, to a fifth node of the interconnect, represented via vertex 8140. In another, current can flow from the second node, of the interconnect, represented via vertex 8110 to fourth node, of the interconnect, represented via vertex 8130.

Stress at the second node can be calculated via $\sigma_1 = \sigma_0 + c \cdot J_{8210} \cdot L_{8210}$, where $\sigma_0$ is stress at the first node, $J_{8210}$ is a current density of a first branch of the interconnect associated with edge 8210, and $L_{8210}$ is a length of the first branch of the interconnect associated with edge 8210. As noted above, $$c = \frac{Z^* e \rho}{\Omega},$$

where '$Z^*$' is an effective electron density, 'e' is an electron charge, '$\rho$' is a resistivity, and '$\Omega$' is an effective atomic volume. In one or more embodiments, a branch of an interconnect can include a portion of an interconnect between two nodes.

Stress at the third node can be calculated via $\rho_2 = \sigma_0 + c \cdot J_{8210} \cdot L_{8210} + c \cdot J_{8220} \cdot L_{8220}$, where $J_{8220}$ is a current density of a second branch of the interconnect associated with edge 8220, and $L_{8220}$ is a length of the second branch of the interconnect associated with edge 8220.

Stress at the fourth node can be calculated via $\rho_3 = \sigma_0 + c \cdot J_{8210} \cdot L_{8210} + c \cdot J_{8250} \cdot L_{8250}$, where $J_{8250}$ is a current density of a fifth branch of the interconnect associated with edge 8250, and $L_{8250}$ is a length of the fifth branch of the interconnect associated with edge 8250.

Stress at the fifth node can be calculated via $\rho_4 = \sigma_0 + c \cdot J_{8210} \cdot L_{8210} + c \cdot J_{8250} \cdot L_{8250} + c \cdot J_{8240} \cdot L_{8240}$, where $J_{8240}$ is a current density of a fourth branch of the interconnect associated with edge 8240, and $L_{8240}$ is a length of the fourth branch of the interconnect associated with edge 8240.

In one or more embodiments, differences in displacement can be expressed via $$u_{8110} - u_{8100} = \frac{L_{8210}}{M} \frac{(\sigma_1 + \sigma_0)}{2} = \frac{L_{8210}}{M} \overline{\sigma}_{8210},$$

$$u_{8120} - u_{8110} = \frac{L_{8220}}{M} \frac{(\sigma_2 + \sigma_1)}{2} = \frac{L_{8220}}{M} \overline{\sigma}_{8220},$$

$$u_{8130} - u_{8120} = \frac{L_{8230}}{M} \frac{(\sigma_3 + \sigma_2)}{2} = \frac{L_{8230}}{M} \overline{\sigma}_{8230},$$

$$u_{8140} - u_{8130} = \frac{L_{8240}}{M} \frac{(\sigma_4 + \sigma_3)}{2} = \frac{L_{8240}}{M} \overline{\sigma}_{8240},$$

$$u_{8130} - u_{8110} = \frac{L_{8250}}{M} \frac{(\sigma_3 + \sigma_1)}{2} = \frac{L_{8250}}{M} \overline{\sigma}_{8250},$$

where 'M' is Young's modulus, $L_X$ is a length of an interconnect branch associated with edge X (e.g. $L_{8210}$ is a length of an interconnect branch associated with edge 8210), $u_Y$ is a displacement at an interconnect node associated with vertex Y (e.g. $u_{8110}$ is a displacement at an interconnect node associated with vertex 8100)), and $\overline{\sigma}_Z$ is a stress for an interconnect branch associated with edge Z (e.g., $\overline{\sigma}_{8210}$ is a stress for an interconnect branch associated with edge 8210).

In one or more embodiments, mass conservation can be expressed via $w_{8210}u_{8100} = 0$, $w_{8210}u_{8110} - w_{8250}u_{8100} - w_{8250}u_{8130} = 0$, $w_{8220}u_{8210} - w_{8230}u_{8130} = 0$, $w_{8230}u_{8130} - w_{8250}u_{8130} - w_{8240}u_{8130} = 0$, and $w_{8240}u_{8140} = 0$, where $w_X$ is a width of an interconnect branch associated with edge X (e.g. $W_{8210}$ is a length of an interconnect branch associated with edge 8210) and $u_Y$ is a displacement at an interconnect node associated with vertex Y (e.g., $u_{8110}$ is a displacement at an interconnect node associated with vertex 8100).

In one or more embodiments, mass conservation and displacement can be combined and can be expressed via $$\sum_{k \in S} L_k W_k \overline{\sigma}_k = \sum_{k \in S} a_k \overline{\sigma}_k = 0,$$

where 'S' is a set of interconnect branches of an interconnect, $L_k$ is a length of an interconnect branch 'k', $W_k$ is a width of the interconnect branch 'k', $a_k$ is an area of the interconnect branch 'k', and $\overline{\sigma}_k$ is an average stress of the interconnect branch 'k'. In one or more embodiments, $$\sum_{j \in B} a_j \sigma_j = 0,$$

where B is a set of nodes of the interconnect segment, $a_j$ is a total area of all branches coupled to node 'j', and $\sigma_j$ is a stress of node 'j'.

In one or more embodiments, a stress at a node 'y' can be expressed via $$\sigma_y = \sigma_x + c \sum_{k \in T} J_k L_k = \sigma_x + \frac{Z^* e}{\Omega} V_{xy},$$

where $\sigma_x$ is a stress at a node 'x', 'T' is a set of nodes between node 'x' and node 'y', $J_k$ is a current density at a node 'k', $L_K$ is a length of a branch associated with node 'k', and $V_{xy}$ is a potential between node 'x' and node 'y'. In one or more embodiments, a combination of mass conservation, displacement, and a stress at a node 'y' can be expressed via $$\sum_{y \in S} a_y \left( \sigma_x + \frac{Z^* e}{\Omega} V_{xy} \right) =$$
$$\sigma_x \sum_{y \in S} a_y + \frac{Z^* e}{\Omega} \sum_{y \in S} a_y V_{xy} = \sigma_x 2A + \frac{Z^* e}{\Omega} \sum_{y \in S} V_{xy} = 0,$$

where 'S' is a set of interconnect branches of an interconnect segment, $a_y$ is an area of a yth branch, $\sigma_x$ is a stress at a node 'x', $V_{xy}$ is a potential between node 'x' and node 'y', and 'A' is a total area of the interconnect segment.

In one or more embodiments, utilizing a combination of mass conservation, displacement, and a stress at a node 'y', $\sigma_x$ can be expressed via $$\sigma_x = -\frac{Z^* e}{\Omega} \frac{\sum_{y \in S} a_y V_{xy}}{2A} = -\frac{Z^* e}{\Omega} \frac{\sum_{y \in S} a_y (V_x - V_y)}{2A} =$$
$$-\frac{Z^* e}{\Omega} \left( \frac{V_x}{2A} \sum_{y \in S} a_y - \frac{1}{2A} \sum_{y \in S} a_y V_y \right) = \frac{Z^* e}{\Omega} (V_D - V_x)$$

where $V_D$ is a distributed potential of an interconnect, $V_x$ is a potential at a node 'x', and $V_y$ is a potential at a node 'y'. In one example, $V_D$ can be expressed via $$V_D = \frac{1}{2A} \sum_{y \in S} V_y a_y$$

for discrete potentials. In another example, $V_D$ can be expressed via $$V_D = \frac{\iint V(x,y) dx dy}{\iint dx dy}$$

for continuous potential V(x,y).

Figure 9:
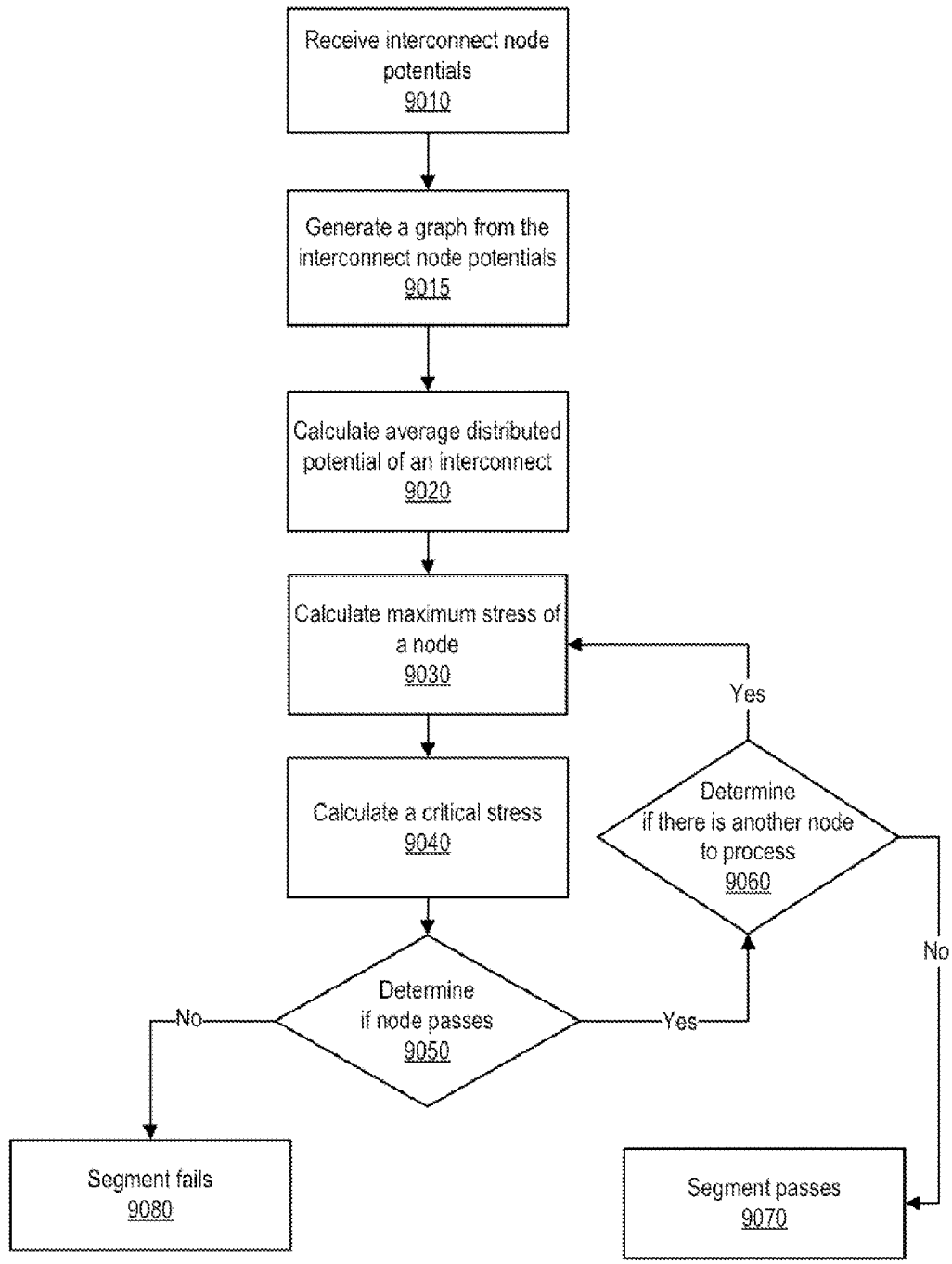
FIG. 9 provides an exemplary method of determining an interconnect failure via utilizing distributed potential, according to one or more embodiments.

Turning now to FIG. 9, a method of determining an interconnect failure via utilizing distributed potential is illustrated, according to one or more embodiments. In one or more embodiments, the method of FIG. 9 can be utilized in determining if a segment of an interconnect passes electromigration stress evaluation. For example, a segment of an interconnect can include a continuous portion of the interconnect. For instance, a segment of an interconnect can include a continuous portion of the interconnect that is included in a particular layer.

At 9010, interconnect node potentials can be received. In one or more embodiments, interconnect node potentials can be received from one or more of a file and a simulation, among others. In one example, interconnect node potentials can be received from an output file of an electronic circuit simulation and/or a CAD tool. For instance, a SPICE simulation can generate the output file. In another example, interconnect node potentials can be received from a simulation and/or a CAD tool. For instance, a SPICE simulation can generate interconnect node potentials, and the interconnect node potentials can be received from the SPICE simulation.

At 9015, a graph can be generated from the interconnect node potentials. In one or more embodiments, generating the graph can include generating a directed graph. For example, the directed graph can represent an interconnect segment of an integrated circuit design. At 9020, an average distributed potential can be calculated. For example, a weighted average across an interconnect can be calculated. In one instance, $$V_D = \frac{1}{2A} \sum_{y \in S} V_y a_y$$

can be calculated, where '$V_D$' is the weighted average across the segment (e.g., average distributed potential), 'A' is an area of the segment, '$V_y$' is a potential (e.g., voltage) at node 'y', and '$a_y$' is a total area of interconnect branches coupled to node 'y', and 'S' is a set of nodes of the interconnect segment. In another instance, $$V_D = \frac{\iint V(x,y) dx dy}{\iint dx dy}$$

can be calculated for a continuous function of potential 'V(x, y)'.

At 9030, a maximum stress of a node can be calculated. For example, $$\sigma_x = \frac{Z^* e}{\Omega} (V_D - V_x)$$

can be calculated, where $\sigma_x$ is a maximum stress of an xth node, 'Z*' is an effective electron density, 'e' is an electron charge. '$V_D$' is a distributed average potential (e.g., a weighted average across an interconnect), '$V_x$' is a potential (e.g., voltage) at the xth node, and '$\Omega$' is an effective atomic volume.

At 9040, a critical stress can be calculated. For example, $$\sigma_C = \frac{Z^* e}{\Omega} \frac{\Delta V_C}{2}$$

can be calculated, where $\sigma_C$ is the critical stress, 'Z*' is the effective electron density, 'e' is the electron charge, '$\Omega$' is the effective atomic volume, and $\Delta V_C$ is a critical change in potential.

At 9050, it can be determined if the node passes. In one or more embodiments, determining if the node passes can include determining if $\sigma_x < \sigma_C$. In one example, if $\sigma_x < \sigma_C$, then it can be determined if there is another node to process at 9060. If there is another node of the interconnect to process, the method can proceed to 9030, where a maximum potential of the other node can be calculated. If there is not another node to process, the method can proceed to 9070, where a segment of the interconnect passes. If $\sigma_x < \sigma_C$ is not satisfied, the segment of the interconnect can fail at 9080, in another example.

In one or more embodiments, if a segment of an interconnect passes, a pass indication can be generated at 9070. For example, generating the pass indication can include providing a pass message. In one instance, the pass message can be provided via a display. In a second instance, the pass message can be provided via a storage device (e.g., provided to a file). In another instance, the pass message can be provided via a network (e.g., provided via the network to a computing device). In one or more embodiments, if a segment of an interconnect fails, a fail indication can be generated at 9080. For example, generating the fail indication can include providing a fail message. In one instance, the fail message can be provided via a display. In a second instance, the fail message can be provided via a storage device (e.g., provided to a file). In another instance, the fail message can be provided via a network (e.g., provided via the network to a computing device). In one or more embodiments, a fail message can include an indication of a node that caused an interconnect to fail.

Figure 10:
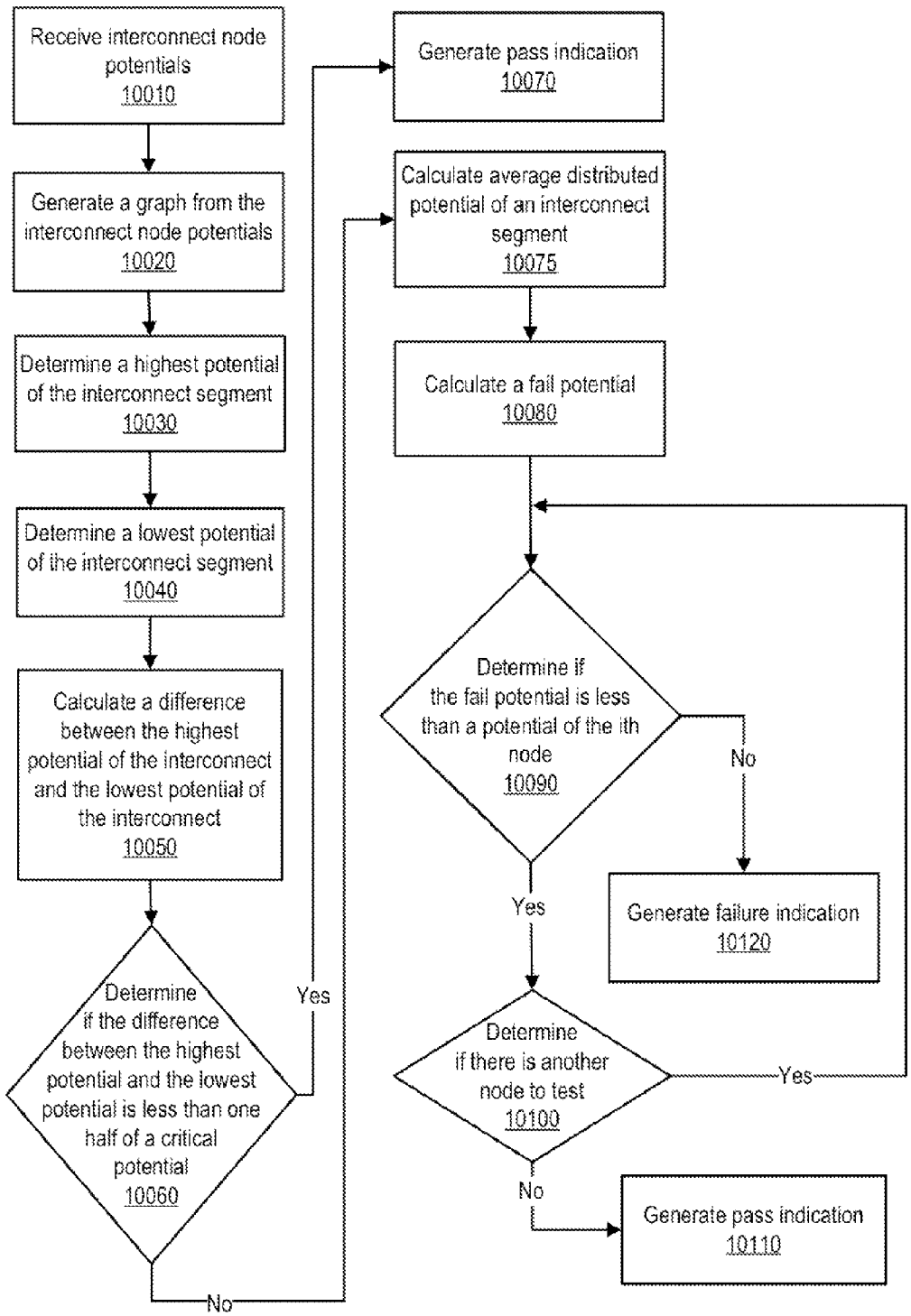
FIG. 10 provides an exemplary method of determining an interconnect failure via utilizing distributed potential and a graph, according to one or more embodiments.

Turning now to FIG. 10, a method of determining an interconnect failure via utilizing distributed potential and a graph is illustrated, according to one or more embodiments. At 10010, interconnect node potentials can be received. In one or more embodiments, interconnect node potentials can be received from one or more a of file and a simulation, among others. In one example, interconnect node potentials can be received from an output file of an electronic circuit simulation and/or a CAD tool. For instance, a SPICE simulation can generate the output file. In another example, interconnect node potentials can be received from a simulation and/or a CAD tool. For instance, a SPICE simulation can generate interconnect node potentials, and the interconnect node potentials can be received from the SPICE simulation.

At 10020, a graph can be generated form the interconnect node potentials. In one or more embodiments, generating the graph can include generating a directed graph. For example, the directed graph can represent an interconnect segment of an integrated circuit design.

At 10030, a highest potential can be determined. For example, the highest potential can be determined via determining a highest potential of a node associated with the graph. In one instance, a highest potential of the interconnect associated with the graph illustrated in FIG. 6 can be determined. In a second instance, a highest potential of the interconnect associated with the graph illustrated in FIG. 7 can be determined. In another instance, a highest potential of the interconnect associated with the graph illustrated in FIG. 8 can be determined. In one or more embodiments, a node associated with a highest potential can be a node with a lowest stress.

At 10040, a lowest potential can be determined. For example, the lowest potential can be determined via determining a lowest potential of a node associated with the graph. In one instance, a lowest potential of the interconnect associated with the graph illustrated in FIG. 6 can be determined. In a second instance, a lowest potential of the interconnect associated with the graph illustrated in FIG. 7 can be determined. In another instance, a lowest potential of the interconnect associated with the graph illustrated in FIG. 8 can be determined. In one or more embodiments, a node associated with a lowest potential can be a node with a highest stress.

At 10050, a difference between the highest potential and the lowest potential can be calculated. For example, the difference between the highest potential and the lowest potential can be calculated via $\Delta V = V_H - V_L$, where $V_H$ is the highest potential and $V_L$ is the lowest potential.

At 10060, it can be determined if the difference between the highest potential and the lowest potential is less than one half of a critical potential difference. For example, it can be determined if $$\Delta V_M < \frac{1}{2}\Delta V_C,$$

where $\Delta V_C$ is the critical potential difference. In one or more embodiments, $\Delta V_C$ can include and/or can be based on a material property of the interconnect.

If $$\Delta V_M < \frac{1}{2}\Delta V_C,$$

an interconnect segment pass can be generated at 10070. For example, generating the pass indication can include providing a pass message. In one instance, the pass message can be provided via a display. In a second instance, the pass message can be provided via a storage device (e.g., provided to a file). In another instance, the pass message can be provided via a network (e.g., provided via the network to a computing device).

$$\Delta V_M < \frac{1}{2}\Delta V_C$$

is not satisfied, the method can proceed to 10075, where a distributed potential of an interconnect associated with the graph can be calculated. For example, $$V_D = \frac{1}{2A}\sum_{y \in S} V_y a_y$$

can be calculated. In one instance, a distributed potential of the interconnect associated with the graph illustrated in FIG. 6 can be calculated. In a second instance, a distributed potential of the interconnect associated with the graph illustrated in FIG. 7 can be calculated. In another instance, a distributed potential of the interconnect associated with the graph illustrated in FIG. 8 can be calculated.

At 10080, a tail potential can be calculated. For example, a fail potential can be calculated based on the distributed average potential and the critical potential. For instance, a fail potential, denoted via $V_F$, can be calculated via $$V_F = V_D - \frac{1}{2}\Delta V_C.$$

At 10090, it can be determined if the fail potential is less than a potential of an ith node. For example, it can be determined if $V_F < V_i$. If the potential of the ith node of the interconnect satisfies $V_F < V_i$, then it can be determined if there is another node of the interconnect to test at 10100. If there is another node of the interconnect to test, the method can proceed to 10090 to test the other node of the interconnect. If there is not another node of the interconnect to test, the method can proceed to 10110 where a pass indication can be generated. For example, generating the pass indication can include providing a pass message. In one instance, the pass message can be provided via a display. In a second instance, the pass message can be provided via a storage device (e.g., provided to a file). In another instance, the pass message can be provided via a network (e.g., provided via the network to a computing device).

If the potential of the ith node of the interconnect does not satisfy $V_F<V_i$, then a failure message can be generated at 10120. For example, generating the failure indication can include providing a failure message. In one instance, the failure message can be provided via a display. In a second instance, the failure message can be provided via a storage device (e.g., provided to a file). In another instance, the failure message can be provided via a network (e.g., provided via the network to a computing device). In one or more embodiments, the failure message can include an indication of the ith node and/or its potential that failed to satisfy $V_F<V_i$.

In one or more embodiments, one or more passive elements of an interconnect can be identified and/or processed in determining if the interconnect passes one or more electromigration stress examinations and/or evaluations. In one example, one or more passive elements of an interconnect can include one or more resistors. In a second example, one or more passive elements of an interconnect can include one or more capacitors. In another example, one or more passive elements of an interconnect can include one or more inductors.

In one or more embodiments, one or more passive elements can be accounted for utilizing $$V_D = \frac{A_I}{A_T} V_I + \frac{A_R}{A_T} V_R + \frac{A_L}{A_T} V_L + \frac{A_C}{A_T} V_C,$$

where $A_I$ is a total area of an interconnect segment, $V_1$ is a distributed potential of the interconnect, $A_R$ is an area of resistors of the interconnect. $V_R$ is a distributed potential of resistors of the interconnect, $A_L$ is an area of inductors of the interconnect, $V_L$ is a distributed potential of inductors of the interconnect, $A_C$ is an area of capacitors of the interconnect, $V_C$ is a distributed potential of capacitors of the interconnect, and $A_T$ is a total area of the interconnect segment (e.g., $A_T = A_1 + A_R + A_L + A_C$). In one instance, $$V_C = \frac{1}{A_T} \sum_{k \in S} V_k a_k,$$

where S is a set of all capacitor terminals, $V_k$ is a potential of a capacitor terminal 'k', and $a_k$ is an interconnect area of capacitor 'k' at the same interconnect layer of the segment. In a second instance, $$V_R = \frac{1}{2A_T} \sum_{k \in S} V_k a_k,$$

where S is a set of all resistor terminals, $V_k$ is a potential of a resistor terminal 'k', and $a_k$ is an area of the resistor at the same interconnect layer of the segment coupled to resistor terminal 'k'. In a third instance, $$V_L = \frac{1}{2A_T} \sum_{k \in S} V_k a_k,$$

where S is a set of all inductor terminals, $V_k$ is a potential of an inductor terminal 'k', and $a_k$ is an area of the inductor at the same interconnect layer of the segment coupled to inductor terminal 'k'. In another instance, $$V_T = \frac{1}{2A_T} \sum_{k \in S} V_k a_k,$$

where S is a set of all nodes of an interconnect, $V_k$ is a potential of a node 'k', and $a_k$ is a total interconnect area of node 'k'.

In one or more embodiments, an interconnect can be evaluated as failing or to fail. For example, an interconnect can be evaluated as to fail via one or more methods and/or processes described above. In one or more embodiments, an interconnect that has been evaluated as failing or to fail can be modified such that a modified interconnect (e.g., the interconnect and its modification) can be evaluated as passing or to pass. For example, the interconnect that has been evaluated as failing or to fail can be modified with a stub that can reduce electromigration stress.

Figure 11:
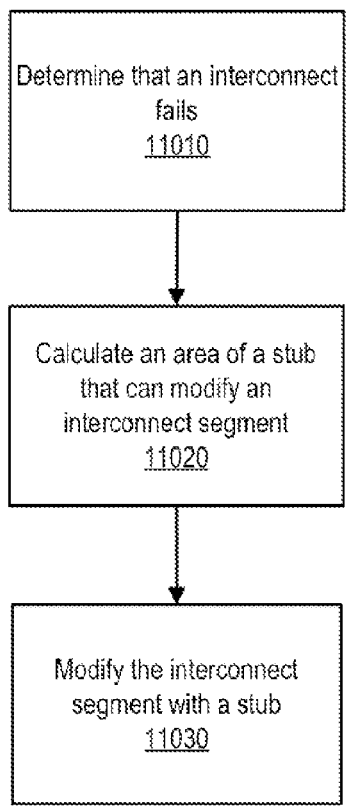
FIG. 11 provides an exemplary method of modifying an interconnect segment that fails, according to one or more embodiments.

Turning now to FIG. 11, a method of modifying an interconnect segment that fails is illustrated, according to one or more embodiments. At 11010, it can be determined that an interconnect segment fails. For example, determining that an interconnect segment fails can include one or more methods and/or processes described herein. In one or more embodiments, an interconnect segment can be evaluated as failing or to fail if $$V_D - V_i \le \frac{1}{2} \Delta V_C$$

cannot be satisfied, where $V_i$ is a maximum violation node. In one example, $V_i$ can be changed. For instance, electrical characteristics of the circuit can be changed to produce a different value for $V_i$. In another example, a value of $V_D$ can be modified such that a value of $V_i$ is not changed and $$V_D - V_i \le \frac{1}{2} \Delta V_C$$

can be satisfied.

Figure 12:
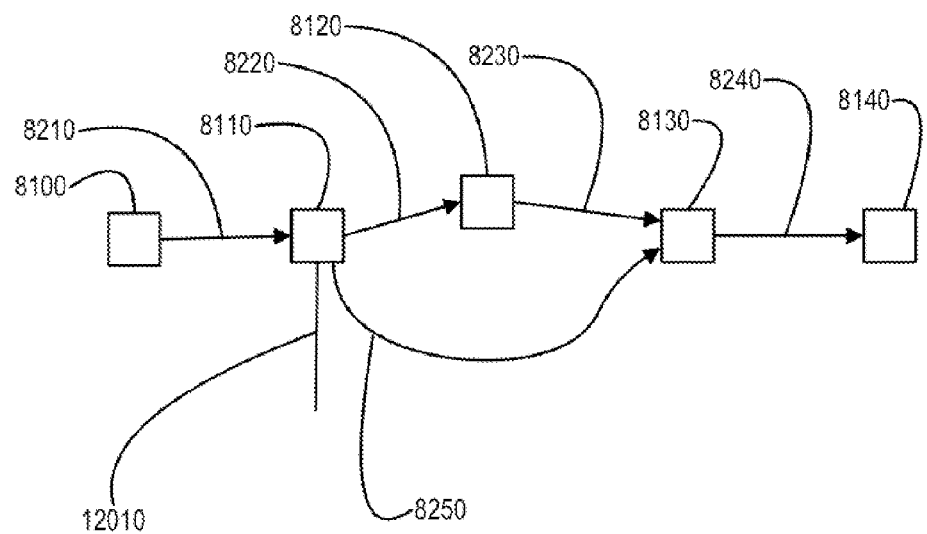
FIG. 12 provides an exemplary directed graph that can represent an interconnect modified with a stub, according to one or more embodiments.

At 11020, an area of a stub, that can modify an interconnect segment, can be calculated. In one or more embodiments, a stub can be added to an interconnect segment, and the interconnect segment with the additional stub can produce a different value for $V_D$ such that $$V_D - V_i \le \frac{1}{2} \Delta V_C$$

can be satisfied. For example, a different distributed potential $V'_D$ such that $$V'_D = V_S \frac{a_S}{A + a_S} + \frac{1}{2} \sum_{k \in B} V_k \frac{a_S}{A + a_S},$$

where B is a set of all nodes of a segment of the interconnect, $V_k$ is a potential at node 'k' A is an area of the segment of the interconnect, $a_S$ is an area of a stub, and $V_S$ is a potential of the stub. For instance, a stub 12010 can be added to an interconnect, as illustrated in FIG. 12. As such, $$V'_D = V_S \frac{a_S}{A+a_S} + \frac{1}{2} \sum_{k \in B} V_k \frac{a_S}{A+a_S} =$$

$$V_S \frac{a_S}{A+a_S} + \frac{1}{2} \frac{A}{A+a_S} \sum_{k \in B} V_k \frac{a_k}{A} = V_S \frac{a_S}{A+a_S} + V_D \frac{A}{A+a_S}.$$

As follows, as can be determined, where $$a_S = A \frac{V'_D - V_D}{V_S - V'_D}.$$

Figure 13:
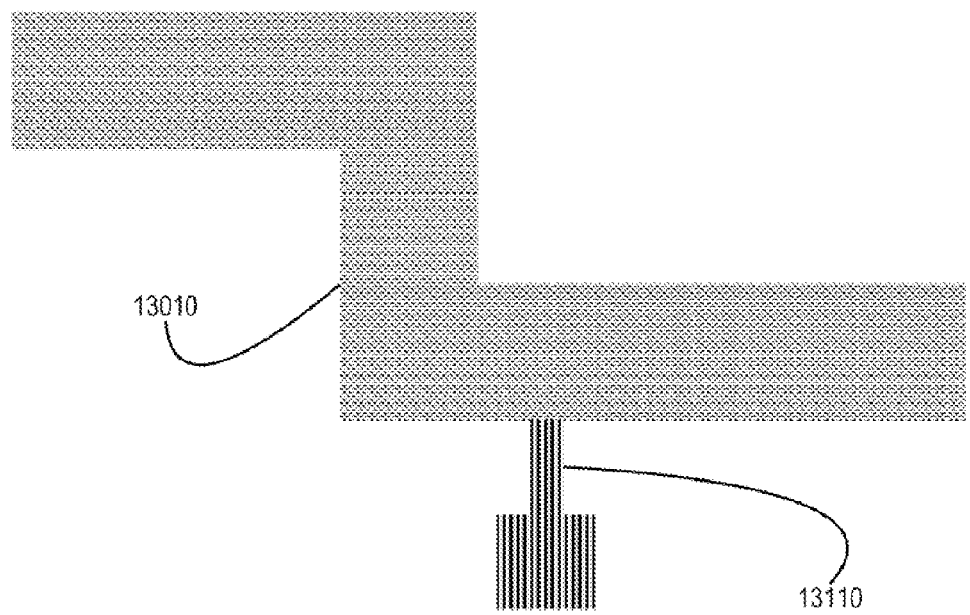
FIG. 13 illustrates an exemplary interconnect segment modified with an additional stub, according to one or more embodiments.

For example, as can be an area of a stub 13110 added to an interconnect 13010, as illustrated in FIG. 13.

At 11030, a stub with an area calculated via method element 11020 can be added to the interconnect segment. For example, modifying the interconnect segment with the stub can satisfy $$V_D - V_i \le \frac{1}{2} \Delta V_C,$$

and the interconnect segment can pass an electromigration stress evaluation and/or examination.

Figure 14:
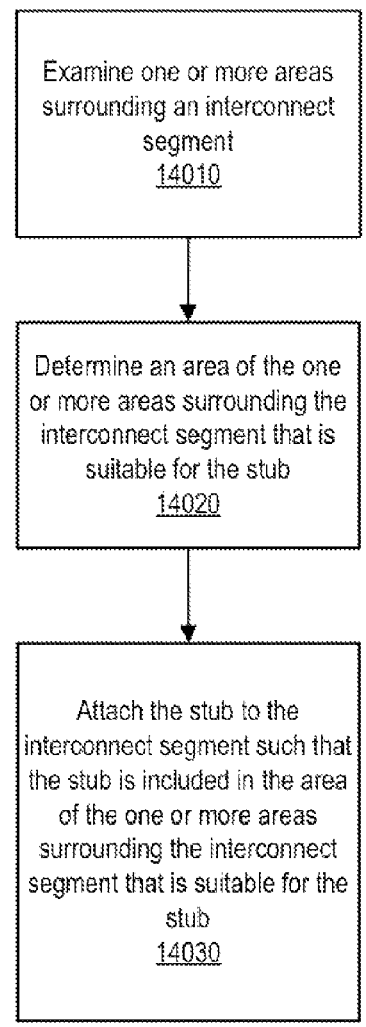
FIG. 14 provides an exemplary method of determining a placement of a stub, according to one or more embodiments.

Turning now to FIG. 14, a method of determining a placement of a stub is illustrated, according to one or more embodiments. At 14010, one or more areas surrounding an interconnect segment can be examined. For example, one or more devices (e.g., semiconductor devices, resistors, capacitors, inductors, etc.) can be proximate to the interconnect segment can bound one or more areas surrounding the interconnect segment. For instance, examining an area surrounding the interconnect segment can include determining one or more boundaries of the area.

At 14020, an area of the one or more areas surrounding the interconnect segment that is suitable for the stub can be determined. For example, an area of the one or more areas surrounding the interconnect segment that is suitable for the stub can be greater than the area of the stub (e.g., as calculated above). In one or more embodiments, an area of the one or more areas surrounding the interconnect segment that is suitable for the stub can be based on a possible effect of the stub on the interconnect segment. For example, the stub can alter a capacitance of the interconnect segment. For instance, an area of the one or more areas surrounding the interconnect segment that is suitable for the stub can be based on a minimization of a change in a coupling capacitance resulting from a placement of the stub.

In one or more embodiments, determining the area of the one or more areas surrounding the interconnect segment that is suitable for the stub can include receiving user input. For example, the user input can indicate the area from possible multiple areas available for placement of the stub. At 14030, the stub can be attached to the interconnect segment such that the stub is included in the area of the one or more areas surrounding the interconnect segment that is determined to be suitable for the stub.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes and/or methods of one or more embodiments can be implemented using any combination of software, firmware, and/or hardware. As a preparatory step to practicing the invention in software, code (whether software or firmware) according to one or more embodiments can be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

In one or more embodiments, a processor (e.g., a central processing unit or CPU) can execute instructions from a memory medium that stores the instructions that can include one or more software programs in accordance with one or more of methods, processes and/or flowcharts described herein. In one example, the processor and the memory medium, that stores the instructions which can include one or more software programs in accordance with one or more of methods, processes and/or flowcharts described herein, can form one or more means for one or more functionalities described with references to methods, processes and/or flowcharts herein. In another example, an ASIC can be configured with one or more configurations in accordance with one or more of methods, processes and/or flowcharts described herein, that can form one or more means for one or more functionalities described with references to methods, processes and/or flowcharts herein. One or more of the method elements described herein and/or one or more portions of an implementation of a method element can be repeated, can be performed in varying orders, can be performed concurrently with one or more of the other method elements and/or one or more portions of an implementation of a method element, or can be omitted, according to one or more embodiments.

Although this disclosure is described herein with reference to specific embodiments, various modifications and changes can be made without departing from the scope of the embodiments as set forth herein. Accordingly, the specification and figures are to be regarded in an illustrative rather than a restrictive sense, and all such modifications are intended to be included with the scope of the embodiments. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method, comprising:
generating, using a data processing system, a directed graph that represents an interconnect segment of an integrated circuit design;
determining, using the data processing system, a highest potential node of nodes of the directed graph that represents the interconnect segment;

determining, using the data processing system, a lowest potential node of the nodes of the directed graph that represents the interconnect segment;
calculating, using the data processing system, a potential difference between a first potential associated with the highest potential node and a second potential associated with the lowest potential node;
determining, using the data processing system, if the potential difference is less than one half of a critical potential difference; and
if the potential difference is less than one half of the critical potential difference, indicating, using the data processing system, that the interconnect segment of the integrated circuit design passes.

2. The method of claim 1, further comprising:
if the potential difference is not less than one half of the critical potential difference:
  calculating, using the data processing system, an average distributed potential of the nodes of the directed graph that represents the interconnect segment;
  calculating, using the data processing system, a fail potential based on the average distributed potential and the critical potential difference;
  determining, using the data processing system, if the fail potential is less than a potential of a node of the nodes of the directed graph that represents the interconnect segment;
  if the fail potential is less than a potential of a node of the nodes of the directed graph that represents the interconnect segment, indicating, using the data processing system, that the interconnect segment of the integrated circuit design passes; and
  if the fail potential is not less than the potential of the node of the nodes of the directed graph that represents the interconnect segment, indicating, using the data processing system, that the interconnect segment of the integrated circuit design fails.

3. The method of claim 2, wherein the average distributed potential of the nodes of the directed graph that represents the interconnect segment is based on at least one of a potential of a resistor, a potential of a capacitor, and a potential of an inductor.

4. The method of claim 1, further comprising:
if the potential difference is not less than one half of the critical potential difference:
  calculating, using the data processing system, an average distributed potential of the nodes of the directed graph that represents the interconnect segment;
  calculating, using the data processing system, a fail potential based on the average distributed potential and the critical potential difference;
  determining, using the data processing system, that the fail potential is not less than a potential of a node of the nodes of the directed graph that represents the interconnect segment;
  calculating, using the data processing system, a potential of the stub and a different average distributed potential;
  calculating, using the data processing system, an area of a stub based on the average distributed potential, the different average distributed potential, and the potential of the stub; and
  modifying, using the data processing system, the interconnect segment of the integrated circuit design via adding the stub to the interconnect segment of the integrated circuit design.

5. The method of claim 4, wherein modifying, using the data processing system, the interconnect segment of the integrated circuit design via adding the stub to the interconnect segment of the integrated circuit design includes determining a location for a placement of the stub.

6. The method of claim 1, further comprising:
if the potential difference is not less than one half of the critical potential difference:
  calculating, using the data processing system, an average distributed potential of the nodes of the directed graph that represents the interconnect segment;
  calculating, using the data processing system, a fail potential based on the average distributed potential and the critical potential difference;
  determining, using the data processing system, if the fail potential is less than a potential of a first node of the nodes of the directed graph that represents the interconnect segment;
  if the fail potential is less than the potential of the first node:
    determining, using the data processing system, that there is a potential of a second node of the nodes of the directed graph that represents the interconnect segment; and
    determining, using the data processing system, if the fail potential is less than the potential of the second node.

7. The method of claim 1, wherein edges of the directed graph represent current flow associated with the interconnect segment.

8. A data processing system, comprising:
a storage device that stores instructions; and
a processor, coupled to the storage device, that executes the instructions, wherein as the processor executes the instructions, the data processing system:
  generates a directed graph that represents an interconnect segment of an integrated circuit design;
  determines a highest potential node of nodes of the directed graph that represents the interconnect segment;
  determines a lowest potential node of the nodes of the directed graph that represents the interconnect segment;
  calculates a potential difference between a first potential associated with the highest potential node and a second potential associated with the lowest potential node;
  determines if the potential difference is less than one half of a critical potential difference; and
  if the potential difference is less than one half of a critical potential difference, indicates that the interconnect segment of the integrated circuit design passes.

9. The data processing system of claim 8, wherein as the processor executes the instructions, the data processing system:
if the potential difference is not less than one half of the critical potential difference:
  calculates an average distributed potential of the nodes of the directed graph that represents the interconnect segment;
  calculates a fail potential based on the average distributed potential and the critical potential difference;
  determines if the fail potential is less than a potential of a node of the nodes of the directed graph that represents the interconnect segment;
  if the fail potential is less than the potential of the node of the nodes of the directed graph that represents the interconnect segment, indicates that the interconnect segment of the integrated circuit design passes; and if the fail potential is not less than the potential of the node of the nodes of the directed graph that represents the interconnect segment, indicates that the interconnect segment of the integrated circuit design fails.

10. The data processing system of claim 9, wherein the average distributed potential of the nodes of the directed graph that represents the interconnect segment is based on at least one of a potential of a resistor, a potential of a capacitor, and a potential of an inductor.

11. The data processing system of claim 8, wherein as the processor executes the instructions, the data processing system:

if the potential difference is not less than one half of the critical potential difference:
calculates an average distributed potential of the nodes of the directed graph that represents the interconnect segment;
calculates a fail potential based on the average distributed potential and the critical potential difference;
determines that the fail potential is not less than a potential of a node of the nodes of the directed graph that represents the interconnect segment;
calculates a potential of the stub and a different average distributed potential;
calculates an area of a stub based on the average distributed potential, the different average distributed potential, and the potential of the stub; and
modifies the interconnect segment of the integrated circuit design via adding the stub to the interconnect segment of the integrated circuit design.

12. The data processing system of claim 11, wherein when the data processing system modifies the interconnect segment of the integrated circuit design via adding the stub to the interconnect segment of the integrated circuit design, the data processing system determines a location for a placement of the stub.

13. The data processing system of claim 8, wherein as the processor executes the instructions, the data processing system:

if the potential difference is not less than one half of the critical potential difference:
calculates an average distributed potential of the nodes of the directed graph that represents the interconnect segment;
calculates a fail potential based on the average distributed potential and the critical potential difference;
determines if the fail potential is less than a potential of a first node of the nodes of the directed graph that represents the interconnect segment;
if the fail potential is less than the potential of the first node:
determines that there is a potential of a second node of the nodes of the directed graph that represents the interconnect segment; and
determines if the fail potential is less than the potential of the second node.

14. The data processing system of claim 8, wherein edges of the directed graph represent current flow associated with the interconnect segment.

15. A non-transitory computer readable storage device that stores instructions, which when executed by a processor of a data processing system, the data processing system:
generates a directed graph that represents an interconnect segment of an integrated circuit design;
determines a highest potential node of nodes of the directed graph that represents the interconnect segment;
determines a lowest potential node of the nodes of the directed graph that represents the interconnect segment;
calculates a potential difference between a first potential associated with the highest potential node and a second potential associated with the lowest potential node;
determines if the potential difference is less than one half of a critical potential difference; and
if the potential difference is less than one half of a critical potential difference, indicates that the interconnect segment of the integrated circuit design passes.

16. The non-transitory computer readable storage device of claim 15, wherein the non-transitory computer readable storage device further stores instructions, which when executed by the processor of the data processing system, the data processing system:

if the potential difference is not less than one half of the critical potential difference:
calculates an average distributed potential of the nodes of the directed graph that represents the interconnect segment;
calculates a fail potential based on the average distributed potential and the critical potential difference;
determines if the fail potential is less than a potential of a node of the nodes of the directed graph that represents the interconnect segment;
if the fail potential is less than the potential of the node of the nodes of the directed graph that represents the interconnect segment, indicates that the interconnect segment of the integrated circuit design passes; and
if the fail potential is not less than the potential of the node of the nodes of the directed graph that represents the interconnect segment, indicates that the interconnect segment of the integrated circuit design fails.

17. The non-transitory computer readable storage device of claim 16, wherein the average distributed potential of the nodes of the directed graph that represents the interconnect segment is based on at least one of a potential of a resistor, a potential of a capacitor, and a potential of an inductor.

18. The non-transitory computer readable storage device of claim 15, wherein the non-transitory computer readable storage device further stores instructions, which when executed by the processor of the data processing system, the data processing system:

if the potential difference is not less than one half of the critical potential difference:
calculates an average distributed potential of the nodes of the directed graph that represents the interconnect segment;
calculates a fail potential based on the average distributed potential and the critical potential difference;
determines that the fail potential is not less than a potential of a node of the nodes of the directed graph that represents the interconnect segment;
calculates a potential of the stub and a different average distributed potential;
calculates an area of a stub based on the average distributed potential, the different average distributed potential, and the potential of the stub; and
modifies the interconnect segment of the integrated circuit design via adding the stub to the interconnect segment of the integrated circuit design.

19. The non-transitory computer readable storage device of claim 16, wherein when the data processing system modifies the interconnect segment of the integrated circuit design via adding the stub to the interconnect segment of the integrated circuit design, the data processing system determines a location for a placement of the stub.

20. The non-transitory computer readable storage device of claim 15, wherein edges of the directed graph represent current flow associated with the interconnect segment.

* * * * *